B. G. BOONE.
AUTOMATIC WAGON OILER.
APPLICATION FILED JULY 9, 1914.
1,158,888.
Patented Nov. 2, 1915.
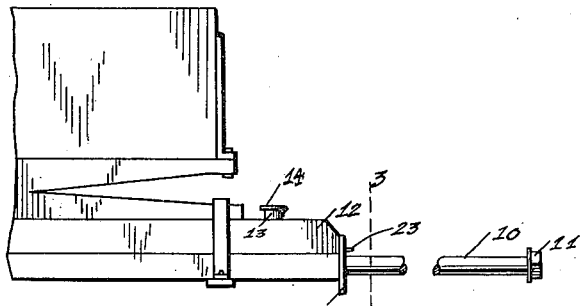
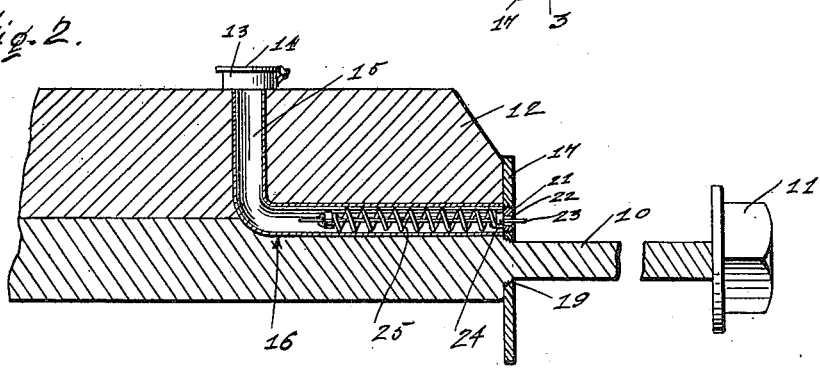
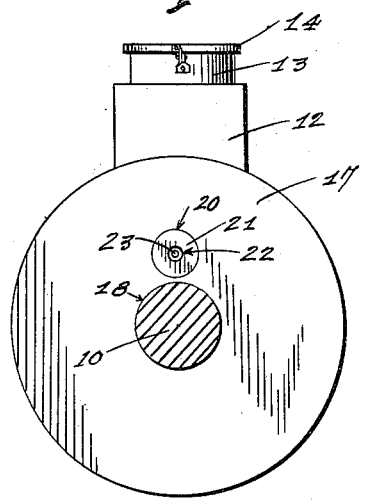
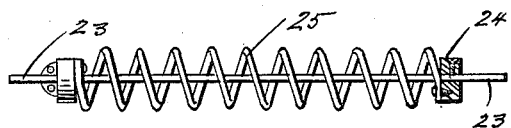
Inventor
B. G. Boone.
Attorneys

UNITED STATES PATENT OFFICE.

BUEL GODFRY BOONE, OF GASTON, SOUTH CAROLINA.

AUTOMATIC WAGON-OILER.

1,158,888.  Specification of Letters Patent.  Patented Nov. 2, 1915.

Application filed July 9, 1914. Serial No. 850,029.

*To all whom it may concern:*

Be it known that I, BUEL G. BOONE, a citizen of the United States, residing at Gaston, in the county of Lexington, State of South Carolina, have invented certain new and useful Improvements in Automatic Wagon-Oilers; and I do hereby declare the following to be a full, clear, and exact description of the invention, such as will enable others skilled in the art to which it appertains to make and use the same.

This invention relates to axle lubricators of that class in which the oil passage to the axle is provided with a plunger or touch pin repelled by the play of the vehicle wheel while rotating in order to keep said passage open and allow the proper flow of oil.

A principal object of this invention is to provide a simple and effective lubricating device of the character referred to in which the spring projected plunger is directly actuated by the inner end of the wheel-hub.

Another object is to simplify the general construction of devices of this nature.

With the above and other objects in view the invention consists in general of certain details of construction and combination of parts hereinafter fully described, illustrated in the accompanying drawings; and specifically claimed.

In the accompanying drawing, like characters of reference indicate like parts in the several views, and Figure 1 is a rear elevation of one side of a vehicle provided with applicant's improved lubricating means, and having the wheel removed; and Fig. 2 is a longitudinal vertical section thereof. Fig. 3 is a view taken on the line 3—3 of Fig. 1. Fig. 4 is an enlarged detail view of the plunger and spring.

In carrying out the objects of this invention there is provided an axle 10 of any desired type provided with the usual nut or other hub-retaining means 11. This axle 10 is supported by the usual bolster 12 which has an oil receptacle or cup 13 provided with a suitable hinge cover 14. From this oil cup 13 leads a right angular passage 15 which extends downwardly through the bolster 12 and outwardly toward the wheel-bearing portion of the axle 10. This oil passage 15 is preferably of metal tubing or thin piping, and when used with a square axle as illustrated by the drawing, the square portion of the axle is slightly grooved as at 16 to permit the insertion of the horizontal portion of the piping. By this construction the feed end of the piping is brought quite close to the spindle. The end of the bolster 12 against which the inner end of the wheel-hub ordinarily rubs is protected by a metal guard 17 provided with a central, threaded opening 18 adapted to be screwed on the threaded portion 19 immediate the shoulder of the axle 10. This guard 17 is further provided with a second opening 20 similarly threaded for the reception of threaded disk 21 which has a circular perforation 22 opposite and in front of the feed end of the piping 15 through which slightly projects a plunger 23. The plunger 23 is of less diameter than the perforation 22, and has a fixed washer 24 of greater diameter than the perforation 23, but of less diameter than the oil piping 15. A spring 25 normally forces the plunger to project slightly beyond the outer face of the guard 17, and likewise causes the washer 24 fixed on said plunger to bear against the disk 21, thus preventing the egress of oil through the perforation 22 in said disk to the spindle. By this construction the play of the wheel along the spindle due to inequalities of the road, lateral strains, etc., will intermittently cause the end of the wheel-hub to repel the projecting end of the plunger and thus remove the washer 24 fixed thereto from in front of the perforation 22, whereby oil will flow to the spindle until the wheel returns, when the perforation 22 is again closed to the action of the spring 25 on the plunger. There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described my invention what is claimed as new, is:—

1. The combination with an axle having a wheel spindle and a bolster thereon, of said bolster being provided in its face adjacent the axle with a longitudinal groove and provided with a transverse bore communicating with the groove, an angular pipe member disposed in the bore and the groove, and a valve in the pipe member at the end of the bolster.

2. The combination with an axle having a wheel spindle and a bolster on the axle and a flange on the spindle at the end of the bolster, of the bolster and axle being provided with opposed grooves adjacent the spindle, a transverse bore within the bolster communicating therewith, an angular pipe section disposed in said bore and groove, valve seats carried by the flange, and a valve in the pipe section.

In testimony whereof, I affix my signature, in the presence of two witnesses.

BUEL GODFRY BOONE.

Witnesses:
C. S. GOODWIN,
U. S. GUNTER.

Copies of this patent may be obtained for five cents each, by addressing the "Commissioner of Patents, Washington, D. C."